Patented June 11, 1940

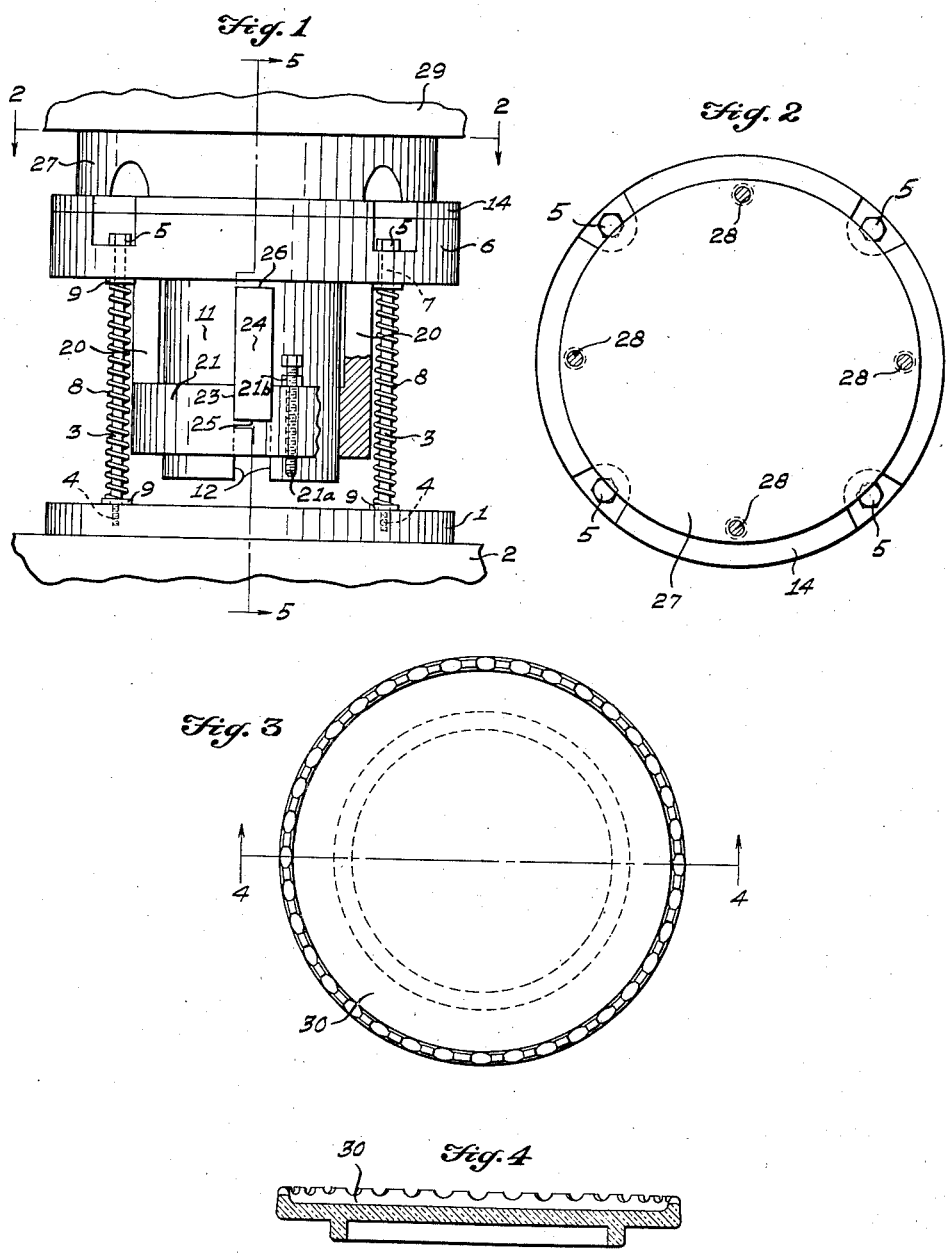

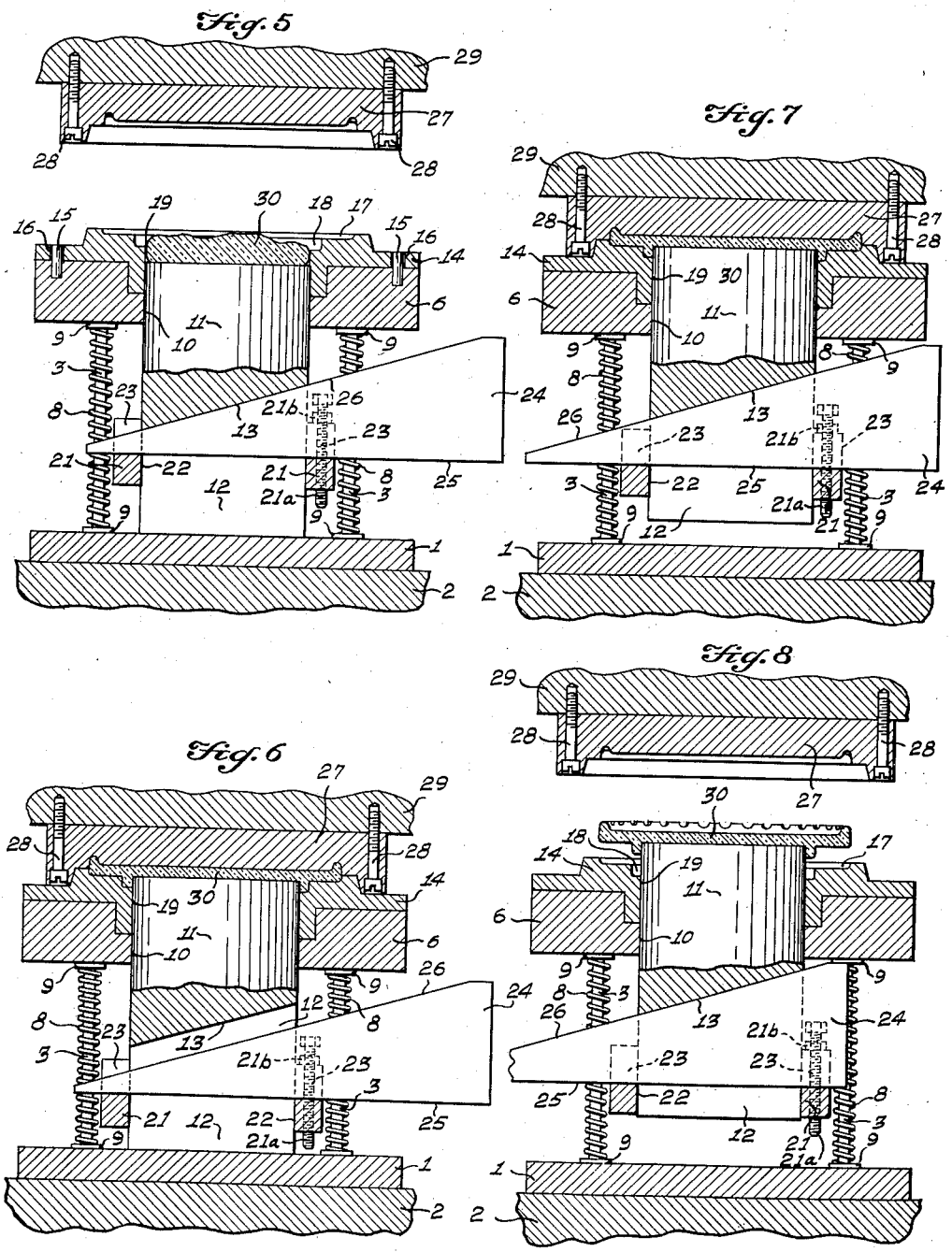

2,204,151

UNITED STATES PATENT OFFICE 2,204,151

MOLDING APPARATUS

Howard H. Rodefer and Henry Vaupel, Bellaire, Ohio, assignors to The Rodefer Glass Company, Bellaire, Ohio, a corporation of Ohio Application May 19, 1937, Serial No. 143,561

8 Claims. (Cl. 49—72)

This invention relates to apparatus for the production of molded bodies from glass and/or plastic materials.

It is an object of this invention to provide apparatus for the production of molded glass bodies without the production of ridges, flashes and imperfections on the front and side surfaces thereof in that the glass initially rests upon the pressing plunger so that the marks of the metal on the hot glass and the marks of the plunger when pressure is applied are all on the back of the glass, leaving the front or top surface free of all imperfections and stains.

It is a further object of this invention to provide means for the production of such bodies wherein the front and side surfaces will be free from ridges, marks, discolorations and other imperfections, whereby to eliminate from the production of such bodies the hitherto necessary grinding operations and the production of waste through the spoilage of molded bodies in the carrying out of these grinding operations.

It is a further object of this invention to provide apparatus wherein the molding of the material is accomplished by the application of upward force thereto at the rear or bottom of the mold, whereby to prevent the production of flash on the side of the molded product and the production of mold marks and/or discolorations on the top face of the molded body.

It is a further object of this invention to provide, in apparatus, a pair of complementary mold members adapted to be engaged, one with the other, and to be subsequently moved together with respect to a male plunger or ram in such manner that upward pressure will be applied at the back or bottom side of the mold.

It is a further object of this invention to provide, in such structure, means for so controlling the male plunger member or ram as to utilize this member as a stripper for removing the molded body from the mold members.

It is a further object of this invention to provide such means in the form of an adjustable wedge, by means of which the male plunger or ram member may be predeterminedly adjusted with respect to the mold members and retained thereby in the desired adjustment.

It is a further object of this invention to provide, in such structure, a pair of complementary mold members, one of which is adapted for the application of pressure to the mechanism and the other of which is adapted for relative movement with respect to the base of the mechanism and with respect to a cooperating male plunger or ram member whereby the force applied to the engaged mold members will engage the male plunger or ram member with the base of the mechanism, whereby to apply upward force from the lower side of the mold to material contained therein and adapted to be molded therein.

These and other objects and advantages will appear from the following description taken in connection with the drawings.

In the drawings:

Figure 1 is a side elevational view of a preferred form of structure constructed according to the principles of this invention;

Figure 2 is a section taken on the line 2—2 of Figure 1;

Figure 3 is a top plan view of a molded body, for the production of which the illustrated mechanism is particularly adapted;

Figure 4 is a section taken on the line 4—4 of Figure 3;

Figure 5 is a section taken on the line 5—5 of Figure 1, showing the position taken by the parts before the application of pressure to the upper mold member subsequent to its engagement with the lower mold member;

Figure 6 is a view similar to Figure 5, but showing the parts in the position taken upon application of pressure to the upper mold member;

Figure 7 is a view similar to Figure 6, but showing the parts in the position taken subsequent to that illustrated in Figure 6, wherein, after the application of pressure to the upper mold member in the molding operation, release of the applied pressure has been accomplished; and Figure 8 is a view similar to Figure 7, but showing the parts in the position taken subsequent to that illustrated in Figure 7, wherein the upper and lower mold members have been disengaged and the wedge utilized to cause the male plunger member or ram to operate as a stripper for separating the molded member from the lower mold member.

Referring to the drawings in detail and with reference to Figures 1, 2 and 5 to 8 inclusive, the base 1 of the mechanism is adapted to be supported on any suitable support or foundation 2, such as the bottom platen of a press. Rigidly secured at their lower ends to the base 1 is a plurality of upwardly disposed standards 3 provided at their lower ends with reduced screw-threaded portions 4 and provided at their upper ends with heads 5. The floating support member 6 in the form of a ring is provided with suitable recesses to receive the heads 5 and is provided also with suitable bores 7, which each slidably engages the upper end of a standard 3. A compression spring 8 is disposed about each standard 3 between the upper surface of the base 1 and the lower surface of the floating support member 6, and suitable washers 9 are optionally provided, one at each end of each spring 8.

The floating support member 6 is provided with a suitably central bore 10, which slidably engages the male plunger or ram member 11 which is provided with a transverse slot 12 having an inclined upper surface 13. The upper surface of the floating support member 6 is also suitably counter sunk to receive the complementary lower surface of the lower mold member 14 which is adapted to be supported thereon and which is optionally non-rotatably secured thereto by any suitable means, such as dowel pins 15 secured to the floating support member 6 and engaging suitably located apertures 16 in the lower mold member 14. In this manner, the lower mold member 14 is non-rotatably secured to the floating support member 6 and may be readily lifted therefrom and replaced by another lower mold member 14 having mold surfaces 17 and 18 of different shape and/or size. A suitable aperture 19 is provided in the lower mold member 14, which is concentric with the aperture 10 in the floating support member 6 and which likewise slidably receives the male plunger or ram member 11.

Extending from the lower side of the floating support member 6 are suitable hangers 20 which connect the floating support member 6 in the form of a ring to the lower or bottom ring 21 which is provided with a central bore 22 similar to and concentric with the bores 10 and 19, and which likewise slidably receives the lower end of the male plunger or ram member 11. The bottom or lower ring member 21 is provided in its upper surface with a transverse slot 23, the lower surfaces of which support the straight bottom surface 25 of the wedge member 24 which has its upper inclined surface 26, which is parallel to the inclined surface 13 of the male plunger or ram member 11, in engagement with this surface 13 of the male plunger or ram member 11. One or more set screws 21a extend vertically downwardly through the bottom ring 21, in which they are screw-threadedly engaged. A lock nut 21b is provided on each set screw 21a for retaining the adjustment thereof with respect to the bottom ring 21. While only one set screw is shown, it is, of course, to be understood that any desired number may be provided. The set screws 21a positively limit the lowermost position of the bottom ring 21 with respect to the base 1 and, therefore, positively limit the relative movement between the plunger member 11 and the engaged complementary portions 6 and 27 of the mold.

When the set screw touches the base 1, it stops further downward movement of the bottom ring 21, its connected floating support member 6 and the lower mold member 14 supported thereby, as explained above. This contact (when it occurs) may be readily observed by the operator, to whom it indicates (when the proper setting of set screw 21a has been made) that insufficient material has been placed in the mold. The operator thereafter increases the amount of material placed in the mold. The set screw 21a, therefore, provides means whereby to control minimum specifications regarding thickness of the article produced by the molding mechanism.

In the interest of clearness, the hangers 20 have been eliminated from the showings of Figures 5 to 8 inclusive and, while these hangers are shown in Figure 1 as being formed integrally with the floating support member 6 and lower or bottom ring 21, it is, of course, to be clearly understood that this showing is merely illustrative and in no wise limiting. It is merely necessary that suitable means be provided for rigidly securing the lower or bottom ring 21 in the desired spaced relation with respect to the floating support member 6 which supports the lower mold member 14. Adjustable hanger means may, of course, be provided where desired.

The upper or female mold member 27 is preferably secured in any desired manner (as by means of screws 28) to a pressure transmitting member or head 29 adapted for connection to the top platen of a press, although, where the mechanism herein illustrated is used independently of the press, pressure may be applied directly to the upper mold member 27. The upper mold member 27 is provided with mold surfaces complementary to the mold surfaces of the lower mold member 14 and the surfaces of the upper and lower mold members are preferably placed in interfitting relation upon engagement of the two mold members, as shown in Figures 6 and 7, in such manner that no grooves or apertures whatsoever exist between the upper and lower mold members and whereby the production of flash upon the molded member is prevented.

If any of the molded material should possibly be extruded from the mold area during molding, this extrusion must necessarily take place between the male plunger or ram member 11 and the bore 19 in the lower mold member 14, and such flash would not appear upon the surfaces of the finished product, which are to be seen by an observer. However, it is, of course, to be understood that the plunger or ram member 11 is so closely fitted to the bores 10 and 19 that such extrusion may take place only after continued use of the mechanism, herein illustrated, has occurred over such a longer period of time as to produce substantial wear between the male plunger or ram member 11 and the cooperating bores in the floating support member 6 and lower mold member 14.

In the operation of molding, the material 30, which is illustrated as glass, is measured by cutting the material from a gob picked up on the end of a punty stick. The material is placed upon the top of the male plunger or ram member 11 which rests upon the base 1, as shown in Figure 5. The upper mold member 27 is engaged with its complementary lower mold member 14, whereby to close the mold. Pressure is then applied through member 29 and through the upper mold member 27 to the lower mold member 14 and its floating support member 6, and the application of pressure is continued until the parts take the position illustrated in Figure 6. It will be seen that between the positions of Figures 5 and 6, the springs 8 have been compressed and the upper and lower mold members 27 and 14, along with the floating support member 6 and the lower ring member 21, have moved downwardly with respect to the male plunger or ram member 11.

While the parts are in the position illustrated in Figure 6, the wedge 24 is advanced to the left until its upper inclined surface 26 engages the inclined upper surface 13 of the slot 12 in the male plunger member 11, whereby to retain the male plunger member in its position with respect to the lower mold member 14 which is illustrated in Figure 6. The pressure has been applied through the male plunger or ram member 11 to the under side of the material which has been forced upwardly by relative movement between the mold and the plunger member into the interior of the mold. Due to the fact that the upper mold member 27 does not apply pressure directly to the material, the material will flow freely with respect to the interior of the mold, and the surfaces defined by the interior surfaces of the upper and lower mold members 27 and 14 will be free of flash marks and ridges or other imperfections which, if they occur at all, will occur at those portions of the molded member, which have been engaged by the plunger member 11 which directly applies pressure thereto.

The material 30, when it is glass as illustrated, is, of course, in molten state even after the parts have reached the position shown in Figure 6. After the wedge is engaged with the male plunger or ram member 11 to retain it in the position shown in Figure 6, the pressure is then released from the members 27 and 29, whereupon the lower mold member and its supporting assembly including floating support member 6, hangers 20 and lower ring 21, along with male plunger or ram member 11 which is retained in stationary relation with respect to members 6, 20 and 21 by the wedge 24, will all move upwardly under the force of the expanding springs 8 until the parts take the position illustrated in Figure 7. While the parts remain in this position, the molten material is prevented from sagging at the center, and the portion of the molded article which is supported by the male plunger or ram member 11 will be retained in stationary position with respect to the other portion of the molded body due to the fact that the plunger member is locked with respect to the lower mold member and its supporting members.

When the article has sufficiently cooled, the upper mold member 27 is withdrawn, as shown in Figure 8, and the wedge 24 is thrust leftwardly from the position shown in Figure 7 to that shown in Figure 8 and, due to the camming action existing between the surface 26 of the wedge 24 and the surface 13 of the male plunger or ram member 11, the ram member is thrust upwardly, whereby to strip the molded member from the lower mold member 14, as shown in Figure 8. Any suitable means, such as a fork, may be used for removing the molded member from the plunger member 11. After removal of the molded work-piece from the male plunger or ram member 11, the parts are returned to the position illustrated in Figure 5, and the cycle is again repeated.

During downward movement of the mold members and supporting assembly, the wedge member 24 is supported by the lower or bottom ring 21 and merely loosely held in position independently of the male plunger or ram member 11.

By the engagement of the upper and lower complementary mold members 27 and 14 independently of the application of pressure, it is possible to secure such close interfitting of the surfaces thereof as to prevent the extrusion, thereafter, of material therebetween. This entirely eliminates the production of flashes at the intersection of the two mold members, and the application of pressure through the male plunger or ram member 11 at the rear of the molded member will cause all mold marks or discolorations due to molding to occur, when they do occur, at the rear of the molded body. Furthermore, because the material first engages the male plunger or ram member 11, any ridges or marks produced by gravity will occur at the rear of the molded body.

It will thus be seen that we have produced a mechanism and method of molding whereby molded bodies of extremely high quality may be produced without the production of flash marks thereon as well as imperfections at points necessitating their removal in order to produce a satisfactory salable article. We have, therefore, extremely simplified the production of molded bodies of glass, plastics and the like and, in addition, have effected great economies by the elimination of spoilage during manufacture.

While the operation of the mechanism has been described as applied to the manufacture of molded glass articles, it is, of course, to be understood that it is susceptible of use with many materials of substantially varying properties. Likewise, it is, of course, to be understood that the size, shape and contour of the complementary upper and lower mold members may be widely varied without sacrificing the advantages of our method and mechanism.

It is, of course, to be understood that the above-described structure is merely illustrative of the manner in which the principles of our invention may be utilized and that we desire to comprehend within our invention such modifications in the structure as come within the scope of the claims and the invention.

Having thus fully described our invention, what we claim as new and desire to secure by Letters Patent is:

1. In mechanism for producing molded bodies, an upper mold member, a lower mold member having a male plunger member reciprocable upwardly with respect thereto, independent means for moving said plunger and locking it in different positions, and means for applying upward force to said male plunger member through application of force to said upper mold member to cause material placed in contact with said lower mold member to be pushed upwardly against the upper mold by relative movement between the mold and said plunger member.

2. In means for producing molded plastic bodies, a ram member adapted to support material to be molded, a pair of complementary mold members, means for engaging said mold members to form a closed mold body and for moving said mold body downwardly with respect to said ram to apply upward molding pressure through said ram to force the molding material into the interior of said mold body, and means for locking said ram member with respect to said mold body to prevent sagging of the molded body.

3. In means for producing molded plastic bodies, a ram member adapted to support material to be molded, a pair of complementary mold members, means operable in one direction for engaging said mold members to form a closed mold body and moving said mold body downwardly with respect to said ram to apply upward molding pressure through said ram to force the molding material into the interior of said mold body, means for positively limiting the downward movement of said closed mold body with respect to said ram, and means for locking said ram member with respect to said mold body to prevent sagging of the molded body, said first-named means being operable in reverse direction for separating one of said mold members from the other of said mold members and the locked ram member.

4. In means for producing molded plastic bodies, a ram member adapted to support material to be molded, a pair of complementary mold members, means operable in one direction for engaging said mold members to form a closed mold body and moving said mold body downwardly with respect to said ram to apply upward molding pressure through said ram to force the molding material into the interior of said mold body, and means for locking said ram member with respect to said mold body to prevent sagging of the molded body, said first-named means being operable in reverse direction for separating one of said mold members from the other of said mold members and the locked ram member, and said locking means being operable for applying further upward pressure to said ram member to strip the molded body from the remaining mold member.

5. In molding means, an upper mold member, a lower mold member adapted for engagement therewith, a male plunger member vertically reciprocable with respect to said lower mold member, means operable for initially engaging said mold members and subsequently moving said engaged mold members downwardly with respect to said plunger, and means for locking said plunger with respect to said lower mold member including a transverse slot in said plunger member and a cooperating wedge member movable therein.

6. In molding means, an upper mold member adapted to be supported by an upper press platen, a base adapted to be supported by a lower press platen, a floating support member resiliently supported on said base, a lower mold member supported on said floating support member, a plunger vertically reciprocable with respect to said lower mold member, and wedge means for moving said plunger with respect to said lower mold member and for locking said plunger against downward movement with respect thereto.

7. In means for producing molded plastic bodies, a ram member adapted to support plastic material to be molded, a lower mold member movable downwardly with respect to said ram member, an upper mold member adapted for interfitting engagement with said lower mold member, means comprising a wedge for positioning said ram relative to said mold members, and means for applying downward pressure to said upper mold member to engage it with said lower mold member and subsequently move the mold members as a unit against said ram member to force plastic material into intimate contact with the interior mold surfaces.

8. In molding means, a pair of complementary engageable mold members, a plunger member adapted for supporting molding material and being slidable upwardly with respect to one of said mold members, means for causing relative sliding movement between said mold members when engaged and said plunger member, adjustable means comprising a set screw adapted to indicate whether sufficient material has been placed in the mold, and wedge means for moving said plunger and holding it in different positions relative to said mold members.

HOWARD H. RODEFER.
HENRY VAUPEL.